(12) United States Patent
Gossmann et al.

(10) Patent No.: US 9,077,392 B2
(45) Date of Patent: Jul. 7, 2015

(54) HIGH-FREQUENCY SWITCHING ASSEMBLY, TRANSMITTER AND METHOD

(75) Inventors: Timo Gossmann, Neubiberg (DE); Jose Moreira, Munich (DE)

(73) Assignee: Intel Mobil Communications GmbH, Neubiberg (DE)

( * ) Notice: Subject to any disclaimer, the term of this patent is extended or adjusted under 35 U.S.C. 154(b) by 157 days.

(21) Appl. No.: 13/407,065

(22) Filed: Feb. 28, 2012

(65) Prior Publication Data

US 2012/0220245 A1 Aug. 30, 2012

(30) Foreign Application Priority Data

Feb. 28, 2011 (DE) .......................... 10 2011 004 869
Mar. 28, 2011 (DE) .......................... 10 2011 006 269

(51) Int. Cl.
*H04B 1/06* (2006.01)
*H04B 1/00* (2006.01)
*H04B 1/04* (2006.01)
*H04B 1/48* (2006.01)

(52) U.S. Cl.
CPC .............. *H04B 1/006* (2013.01); *H04B 1/0475* (2013.01); *H04B 1/48* (2013.01)

(58) Field of Classification Search
USPC ........ 455/91, 95, 248.1; 307/104; 363/16, 17, 363/21.02, 25, 90
See application file for complete search history.

(56) References Cited

U.S. PATENT DOCUMENTS

| | | | | |
|---|---|---|---|---|
| 3,573,388 A | * | 4/1971 | Dagnall, Jr. .................. | 379/292 |
| 4,675,796 A | * | 6/1987 | Gautherin et al. ............. | 363/20 |
| 5,545,971 A | * | 8/1996 | Gomez et al. ................. | 323/259 |
| 5,793,624 A | * | 8/1998 | Couture et al. ................. | 363/89 |
| 7,398,059 B2 | | 7/2008 | Uejima et al. | |
| 7,616,934 B2 | * | 11/2009 | Macphail .................... | 455/248.1 |
| 8,095,082 B2 | | 1/2012 | Deng et al. | |
| 8,280,325 B2 | * | 10/2012 | Zolfaghari ................. | 455/127.3 |
| 2007/0298731 A1 | * | 12/2007 | Zolfaghari ....................... | 455/91 |
| 2008/0231535 A1 | | 9/2008 | Rofougaran et al. | |
| 2011/0115565 A1 | * | 5/2011 | Cabanillas .................... | 330/307 |
| 2012/0062322 A1 | * | 3/2012 | Owen ........................... | 330/296 |

FOREIGN PATENT DOCUMENTS

| | | |
|---|---|---|
| CN | 101060285 A | 10/2007 |
| CN | 101145811 A | 3/2008 |
| CN | 101868921 A | 10/2010 |
| DE | 3423205 A1 | 1/1986 |
| DE | 69123679 T2 | 7/1997 |
| DE | 102008050242 A1 | 4/2010 |
| EP | 1775847 A1 | 4/2007 |
| JP | 2008017031 A | 1/2008 |

* cited by examiner

*Primary Examiner* — Junpeng Chen
(74) *Attorney, Agent, or Firm* — Eschweiler & Associates, LLC

(57) ABSTRACT

A high-frequency switching assembly having a first switching state and a second switching state includes a transmitter and a switch assembly. The transmitter includes a primary side and a secondary side having a first secondary side terminal and a second secondary side terminal and is configured to transmit an HF input signal applied to its primary side to its secondary side by means of inductive coupling. The switch assembly is configured to apply, in one state, a first reference potential to the first secondary side terminal. Further, the switch assembly is implemented to apply, in another state, a second reference potential to the second secondary side terminal.

21 Claims, 7 Drawing Sheets

HIGH-FREQUENCY SWITCHING ASSEMBLY, TRANSMITTER AND METHOD

CROSS-REFERENCE TO RELATED APPLICATIONS

This application claims priority to German Patent Application No. 102011006269.6, which was filed on Mar. 28, 2011, and is incorporated herein by reference in its entirety, and additionally claims priority to German Patent Application No. 102011004869.3, which was filed on Feb. 28, 2011, and is incorporated herein by reference in its entirety.

FIELD

Embodiments of the present invention provide a high-frequency switching assembly, as it can be used, for example, in high-frequency signal sources. Further embodiments provide a transmitter as it can be used, for example, in a mobile radio device.

BACKGROUND

For existing mobile radio standards, a multitude of different frequency ranges have been defined or allocated worldwide by regulating authorities. Thus, for a possibly worldwide and unlimited usability of a mobile radio phone, the manufacturer is faced with the challenge to cover these different frequency bands.

In modern applications, increasingly integrated complex high-frequency circuits are used, which allow to save more and more of the discrete devices necessitated earlier on the printed circuit board. These high-frequency chips include entire receivers, transmitters, frequency generation, signal processing and possibly supply voltage regulation.

However, so far, it is still not possible to integrate, for example, very selective high-quality filters in the high-frequency range which are, however, necessitated in the high-frequency signal path due to the way the system operates. Thereby, every frequency band to be supported will be treated separately and the paths will be combined directly in front of the antenna by means of a high-frequency signal multiplexer.

Since all signal paths to be supported are treated differently on the printed circuit board, the chip manufacturer is faced with the task to either provide a respective number of signal sources (transmitter outputs) and signal sinks (receiver inputs) on the high-frequency chip, or alternatively to offer a lower number of all-purpose sources and sinks, which can, however, then be connected to the individual transmit and receive paths by means of further external switches. Here, the chip manufacturer will rather favor the second method since this consumes less chip area and circuit effort and is generally the less expensive alternative.

The telephone manufacturer, however, will rather try to use the first alternative, i.e., to favor arrangements that are as simple as possible with few switches on the printed circuit board. This saves device costs, development effort and usually allows a better quality of the signal chains, since the signal loss within the chain becomes smaller due to the missing switches.

A switch within the signal path naturally causes signal losses caused by the finite conductance and the parasitic capacitances. Thereby, external switches can normally be built with better performance by the use of specific technologies than those produced within a chip by semiconductor technology.

SUMMARY

According to an embodiment, a high-frequency switching assembly having a first switching state and a second switching state may have: a transmitter component having a primary side and a secondary side having a first secondary side terminal and a second secondary side terminal, wherein the transmitter component is configured to transmit a HF input signal applied to its primary side to its secondary side by means of inductive coupling. The assembly further comprises a switch assembly configured to apply, in the first switching state, a first reference potential to the first secondary side terminal, such that, in the first switching state, a first transmitter output signal can be tapped at the second secondary side terminal, which is based on the HF input signal applied to the primary side of the transmitter means, and to apply, in the second switching state, a second reference potential to the second secondary side terminal, such that, in the second switching state, a second transmitter output signal can be tapped at the first secondary side terminal, which is based on the HF input signal applied to the primary side of the transmitter means.

According to another embodiment, a high-frequency switching assembly having a first switching state and a second switching state comprises a first input terminal configured to receive an HF input signal, a first output terminal configured to provide a first HF output signal, a second output terminal configured to provide a second HF output signal, and a transformer having a primary winding and a secondary winding. The assembly further comprises a first switch and a second switch, wherein the first input terminal is coupled to the primary winding of the transformer, wherein the second high-frequency output terminal is coupled to a first secondary side terminal of the secondary winding, and wherein the first high-frequency output terminal is coupled to a second secondary side terminal of the secondary winding. The first switch is configured to provide, in the first switching state, a first reference potential at the first secondary side terminal of the secondary winding, and the second switch is configured to provide, in the second switching state, a second reference potential at the second secondary side terminal of the secondary winding, such that, in the first switching state, the first HF output signal is based on the HF input signal, and such that, in the second switching state, the second HF output signal is based on the HF input signal.

According to another embodiment, a high-frequency switching assembly having a first switching state and a second switching state comprises a transformer having a primary winding and a secondary winding having a first secondary side terminal and a second secondary side terminal, wherein the transformer is implemented to transmit an HF input signal applied to its primary winding to its secondary winding by means of inductive coupling. The assembly further comprises a switch assembly having a first switching transistor, a second switching transistor and an inverter. The first switching transistor is of a first transistor type and the second switching transistor is of a second transistor type complementary to the first transistor type, and control terminals of the switching transistors are coupled to one another such that the first switching transistor is in its conductive state when the second switching transistor is in its non-conductive state. A switchable path of the first switching transistor is connected between a first reference potential terminal, where a first reference potential is provided, and the first secondary side terminal, such that the first switching transistor provides, in its conductive state, the first reference potential at the first secondary side terminal. A switchable path of the second switching transistor is connected between a second reference potential terminal, where a second reference potential is provided, and the first secondary side terminal, such that the second switching transistor provides, in its conductive state, the second reference potential at the second secondary side terminal. The control terminals of the switching transistors are coupled with an output of the inverter, wherein the inverter is implemented to provide, in the first switching state, the second reference potential at the control terminals of the switching transistors, and provide, in the second switching state, the first reference potential at the control terminals of the switching transistors, such that, in the first switching state, the first switching transistor is in its conductive state and provides the first reference potential at the first secondary side terminal, and a first transmitter output signal can be tapped at the second secondary side terminal, which is based on the HF input signal applied to the primary winding. In the second switching state, the second switching transistor is in its conductive state and provides the second reference potential at the second secondary side terminal, and a first transmitter output signal can be tapped at the first secondary side terminal, which is based on the HF input signal applied to the primary winding. The high-frequency switching assembly further comprises at least one blocking capacitor, which is connected between one of the reference potential terminals where one of the reference potentials is provided, and a ground terminal of the high-frequency switching assembly to provide a high-frequency ground node.

According to another embodiment, a transmitter for providing a transmit signal for a plurality of communication bands comprises an inventive high-frequency switching assembly, and a transmit signal provider coupled to the high-frequency switching assembly. The switching assembly is configured to provide the transmit signal to the high-frequency switching assembly as the HF input signal and select, based on a communication band from the plurality of communication bands in which the transmit signal is to be transmitted, a switching state of the high-frequency switching assembly.

According to another embodiment, a method comprises applying an HF input signal to a primary side of a transmitter means, which is implemented to transmit the applied HF input signal to its secondary side by means of inductive coupling. The method further comprises applying a first reference potential to a first secondary side terminal of the secondary side of the transmitter means, such that a first transmitter output signal can be tapped at a second secondary side terminal of the secondary side of the transmitter means, which is based on the HF input signal applied to the primary side of the transmitter means. Lastly, the method comprises applying a second reference potential to the second secondary side terminal, such that a second transmitter output signal can be tapped at the first secondary side terminal, which is based on the HF input signal applied to the primary side of the transmitter means.

Another embodiment may have a mobile radio device having an inventive transmitter.

According to another embodiment, a portable mobile radio device comprises a baseband processor, a modulator circuit coupled to the baseband processor, an antenna, and a high-frequency switching assembly that is coupled to the modulator circuit and the antenna. The baseband processor is configured to provide a baseband signal, and the modulator circuit is configured to receive the baseband signal to obtain the HF input signal based on the received baseband signal, and provide the obtained HF input signal to the high-frequency switching assembly. The antenna is configured to transmit a signal based on the first transmitter output signal and/or second transmitter output signal of the high-frequency switching assembly.

Embodiments of the present invention provide a high-frequency switching assembly having a first switching state and a second switching state. The high-frequency switching assembly comprises a transmitter component having a primary side and a secondary side having a first secondary terminal and a second secondary side terminal. The transmitter component is configured to transmit a high-frequency input signal (HF input signal) applied to its primary side to its secondary side by means of inductive coupling. Further, the high-frequency switching assembly comprises a switch assembly configured to apply, in the first switching state, a first reference potential to the first secondary side terminal, such that, in the first switching state, a first transmitter output signal can be tapped at the second secondary side terminal, which is based on the HF input signal applied to the primary side of the transmitter component and to apply, in the second switching state, a second reference potential to the second secondary side terminal, such that, in the second switching state, a second transmitter output signal can be tapped at the first secondary side terminal, which is based on the HF input signal applied to the primary side of the transmitter component.

BRIEF DESCRIPTION OF THE DRAWINGS

Embodiments of the present invention will be detailed subsequently referring to the appended drawings, in which:

FIG. 2b is an equivalent diagram of a possible implementation of the circuit shown in FIG. 2a;

DETAILED DESCRIPTION

Before the embodiments of the present invention will be described in detail below based on the accompanying figures, it should be noted that in the figures equal elements or elements having the same function are provided with the same reference numbers and that a repeated description of these elements is omitted. Thus, descriptions of elements provided with the same reference numbers are inter-exchangeable.

Figure 1A:
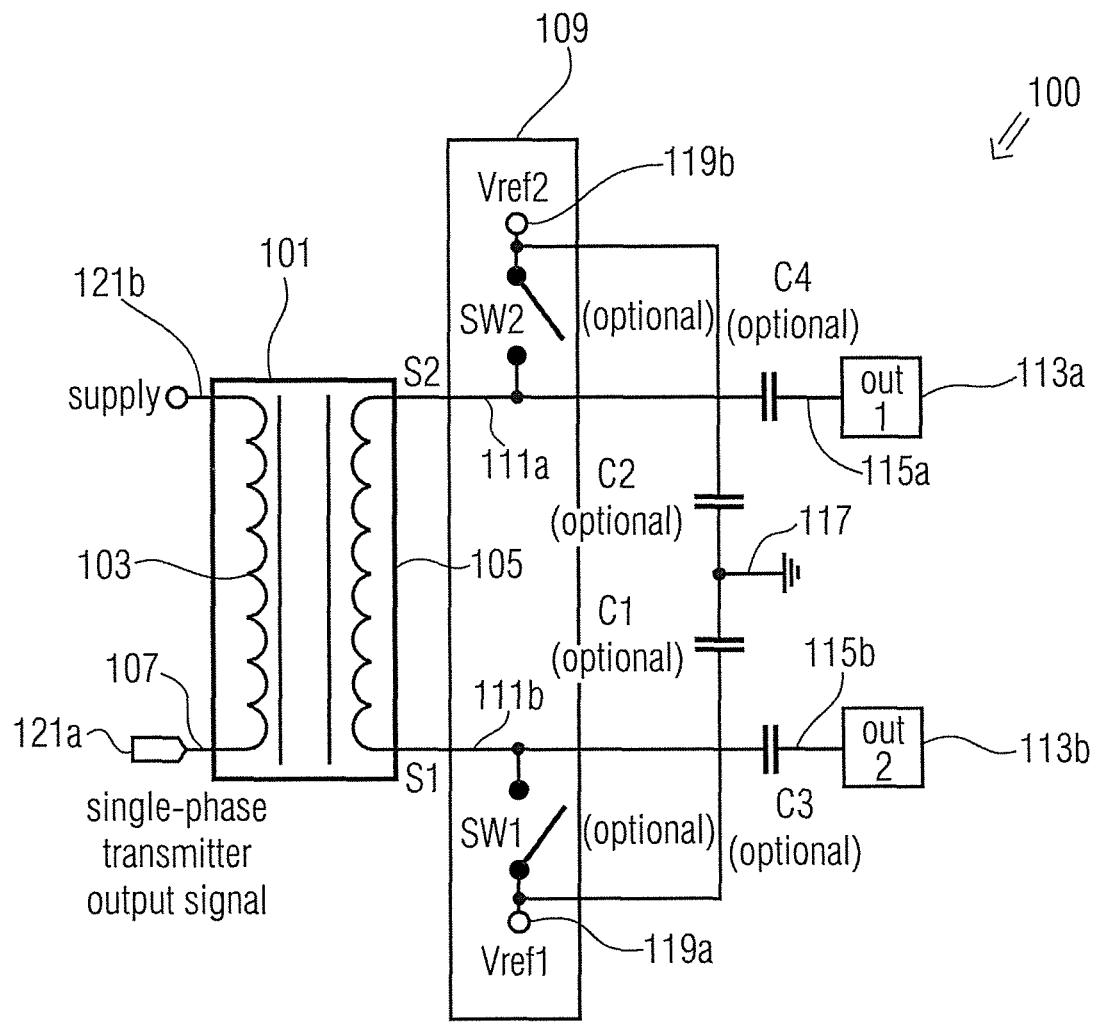
FIG. 1a is an equivalent diagram of a high-frequency switching assembly according to an embodiment for a single-phase HF input signal.

FIG. 1a shows an equivalent diagram of a high-frequency switching assembly 100 according to an embodiment. The high-frequency switching assembly comprises a first switching state and a second switching state. Further, the high-frequency switching assembly 100 comprises a transmitter means 101 having a primary side 103 and a secondary side 105. The secondary side 105 comprises a first secondary side terminal S1 and a second secondary side terminal S2. The transmitter means 101 is implemented to transmit an HF input signal 107 applied to its primary side 103 to its secondary side 105 by means of inductive coupling.

Further, the high-frequency switching assembly 100 comprises a switch assembly 109, which is implemented to apply or provide, in the first switching state, a first reference potential Vref1 to the first secondary side terminal S1 of the secondary side 105 of the transmitter means 101, such that, in the first switching state, a first transmitter output signal 111*a* can be tapped at the second secondary side terminal S2, which is based on the HF input signal 107 applied to the primary side 103 of the transmitter means 101. Further, the switch assembly 109 is implemented to apply or provide, in the second switching state, a second reference potential Vref2 to the second secondary side terminal S2 of the secondary side 105 of the transmitter means 101, such that, in the second switching state, a second transmitter output signal 111*b* can be tapped at the first secondary side terminal S1, which is based on the HF input signal 107 applied to the primary side 103 of the transmitter means 101.

The high-frequency switching assembly 100 shown in FIG. 1 enables that, based on the switching state of the high-frequency switching assembly 100 (and in dependence on a transmitter ratio of the transmitter means 101), the HF input signal 107 can either be tapped at the first secondary side terminal S1 or at the second secondary side terminal S2, while a reference potential (for example Vref1 or Vref2) is applied to the respective other secondary side terminal. Thus, the high-frequency switching assembly 100 can be arranged as a so-called shunt switch in the signal case, where one of its ends (one of the secondary side terminals S1, S2) is respectively connected to a reference potential (and, among others, to a high-frequency ground), and the high-frequency input signal 107 is thus not applied to both terminals S1, S2 of the switch (or the high-frequency switching assembly 100). This enables that the switch shown in FIG. 1*a* or the high-frequency switching assembly 100 shown in FIG. 1*a* can be made more low-ohmic and more linear, such that the HF input signal 107 is less affected than it is in the case in possibly known high-frequency change-over switches.

Further, the assembly shown in FIG. 1*a* allows abandoning a series switch, to both terminals of which the HF input signal 107 would be applied, and would thereby result in less performance due to losses and distortion.

According to some embodiments, the first switching state and the second switching state can be successive in time, such that, at a predetermined point in time, either the first transmitter output signal 111*a* is based on the HF input signal 107, or the second transmitter output signal 111*b* is based on the HF input signal 107. In other words, in the first switching state, a potential or HF signal at the second secondary side terminal S2 is based on the HF input signal 107 on the primary side 103 of the transmitter means 101, and a potential at the first secondary side terminal S1 corresponds to the first reference potential Vref1. In the second switching state, this is reversed, i.e., a potential or HF signal at the first secondary side terminal S1 is based on the HF input signal 107 on the primary side of the transmitter means 101, and the potential at the second secondary side terminal S2 is based on the second reference potential Vref2. Thus, at a predetermined point in time, the HF input signal 107 is only transmitted on one of the two secondary side terminals S1, S2, since one of the reference potentials Vref1, Vref2 is provided at the respective other secondary side terminal by the switch assembly 109.

According to further embodiments, the high-frequency switching assembly 100 can further comprise a first output terminal 113*a* as well as a second output terminal 113*b*. The output terminals 113*a*, 113*b* can form, for example, terminals of a chip, on which the high-frequency switching assembly 100 is integrated. The first output terminal 113*a* can be coupled to the second secondary side terminal S2, such that, in the first switching state, a first HF output signal 115*a*, which is equal to the first transmitter output signal 111*a* or at least based on the same, can be tapped at the first output terminal 113*a*. The second output terminal 113*b* can be coupled to the first secondary side terminal S1, such that, in the second switching state, a second HF output signal 115*b*, which is equal to the second transmitter output signal 111*b* or at least based on the same, can be tapped at the second output terminal 113*b*.

In the present application, a coupling means a direct low-ohmic coupling and an indirect coupling with one or several devices connected in-between, such that a signal at a second circuit node depends on a signal at a first circuit node coupled to the second switching node. In other words, between the two terminals coupled to one another, further devices, in particular passive devices, such as resistors or capacitors (in alternating voltage signals) or switchable paths (switching paths) of active devices, such as switches or transistors, can be connected. With coupled terminals, a device can be connected between these terminals but does not have to, such that two coupled terminals can also be directly connected to one another (i.e., by a low-ohmic conductive connection).

Further, according to the present application, a first terminal is directly connected to a second terminal when a signal applied to the second terminal is identical to a signal applied to the first terminal, wherein parasitic effects or small losses due to conductor resistances are to be neglected. Thus, two directly connected terminals are typically connected via conductive traces or wires without additional devices connected in-between.

Further, the primary side 103 of the transmitter means 101 can comprise a first primary side end terminal 121*a* and a second primary side end terminal 121*b*. Further, the first primary side end terminal 121*a* can form a first input terminal of the high-frequency switching assembly 100. The HF input signal 107 can be applied to the first primary side end terminal 121*a* (and also to the first input terminal of the high-frequency switching assembly 100). At the second primary side end terminal 121*b*, for example, a reference potential for the HF input signal 107 can be applied (for example one of the reference potentials Vref1, Vref2 or a further reference potential or a supply voltage or ground). In the example shown in FIG. 1*a*, a supply voltage is applied merely exemplarily to the second primary side end terminal 121*b*. Further, the second primary side end terminal 121*b* can form a second input terminal of the high-frequency switching assembly 100, to which the reference potential for the HF input signal 107 is applied.

The first output terminal 113*a* can be coupled to the switch assembly 109, such that a potential at the first output terminal 113*a* (for example, the first HF output signal 115*a*) in the second switching state (when the second reference potential Vref2 is applied to the second secondary side terminal S2) is independent of the HF input signal 107. Further, the second output terminal 113*b* can be coupled to the switch assembly 109, such that a potential at the second output terminal 113*b* (for example, the second HF output signal 115*b*) in the first switching state (in which the first reference potential Vref1 is applied to the first secondary side terminal S1) is independent of the HF input signal 107.

According to further embodiments, the output terminals 113*a*, 113*b* can be capacitively coupled to the secondary side terminals S1, S2. In other words, a first (optional) coupling capacitor C4 can be connected between the first output terminal 113a and the second secondary side terminal S2, such that a signal applied to the first secondary side terminal S2 is transmitted to the first output terminal 113a DC free. Further, the second output terminal 113b can also be coupled to the first secondary side terminal S1 by means of a second (optional) coupling capacitor C3, such that a signal applied to the first secondary side terminal S1 is transmitted to the second output terminal 113b DC free.

Thereby, a potential freedom with regard to signal chains to be externally connected can be provided at the output terminals 113a, 113b, although, in the first switching state, the first transmitter output signal 111a oscillates around the first reference potential Vref1, and, in the second switching state, the second transmitter output signal 111b oscillates around the second reference potential Vref2. In other words, since the signal levels each oscillate around the potentials Vref1 or Vref2, a potential freedom with regard to the signal chains to be externally connected can be provided either by the on-chip or off-chip capacitances C3 or C4.

The coupling capacitors C3, C4 can be dimensioned such that they adapt an external wiring as optimum as possible to the internal impedances for transmission optimization, for the frequency range of the HF input signal 107 or the transmitter output signals 111a, 111b, for example as part of impedance matching. The coupling capacitors can, for example, be selected such that an impedance of the external wiring deviates from the impedances of the internal wiring (for example at the secondary side terminals S1, S2) by a maximum of ±5%, ±10%, ±25%.

According to further embodiments, in order to provide high-frequency ground to the transmitter output signals 111a, 111b, the high-frequency switching assembly 100 can comprise one or several blocking capacitors, which are connected between a reference potential terminal (for example, a ground terminal 117) and the switch assembly 109. Thus, the high-frequency switching assembly 100 can comprise, for example, a first blocking capacitor C1, which is connected between the ground terminal 117 and a first reference potential terminal 119a for providing the first reference potential Vref1. Further, the high-frequency switching assembly 100 can comprise a second blocking capacitor C2, which is connected between the ground terminal 117 and a second reference potential terminal 119b for providing the second reference potential Vref2.

Thus, in the first switching state, the first blocking capacitor C1 can provide a high-frequency ground node for the transmitter output signal 111a or the first HF output signal 115a. Further, in the second switching state, the second blocking capacitor C2 can provide a high-frequency ground node for the second transmitter output signal 111b or the second HF output signal 115b.

Thereby, the blocking capacitors C1, C2 can be selected such that the same have an optimum impedance for the frequency range of the HF input signal 107 or the transmitter output signals 111a, 111b.

According to further embodiments, the blocking capacitors C1, C2 can also be omitted, for example, when (extern) supply sources, such as low-impedance voltage sources are applied to the reference potential terminals 119a, 119b, which themselves provide a high-frequency ground node for the transmitter output signals 111a, 111b or the HF output signals 115a, 115b.

According to further embodiments, the switch assembly 109 can comprise a first switch SW1 and a second switch SW2. Thereby, the first switch SW1 can be connected between the first reference potential terminal 119a and the first secondary side terminal S1. The second switch SW2 can be connected between the second reference potential terminal 119b and the second secondary side terminal S2. The first switch SW1 can be implemented to provide or apply, in the first switching state of the high-frequency switching assembly 100, the first reference potential Vref1 at the first secondary side terminal S1. The second switch SW2 can be implemented to provide or apply, in the second switching state of the high-frequency switching assembly 100, the second reference potential Vref2 at the second secondary side terminal S2.

In a closed state, the first switch SW1 can connect, for example, the first reference potential terminal 119a to the first secondary side terminal S1. Further, in a closed state, the second switch SW2 can connect the second reference potential terminal 119b to the secondary side terminal S2.

In the present application, a closed state of a switch means a state where a low-ohmic connection exists between the two terminals of the switch; an open state of a switch is a state where a high-ohmic connection exists between the two terminals of the switch.

In some embodiments, the two switches SW1, SW2 are controlled in a complementary fashion, such that the first switch SW1 is closed when the second switch SW2 is opened, and the first switch SW1 is open when the second switch SW2 is closed.

In the example shown in FIG. 1a, in the first switching state of the high-frequency switching assembly 100, the first switch SW1 is closed and the second switch SW2 is open, in the second switching state of the high-frequency switching assembly 100, the first switch SW1 is open and the second switch SW2 is closed.

In other words, the first switch SW1 and the second switch SW2 are controlled complementary to one another, such that, in the first switching state, the first switch SW1 is conductive and the second switch SW2 is non-conductive, and such that, in the second switching state the second switch SW2 is conductive and the first switch SW1 is non-conductive.

According to some embodiments, the transmitter means 101 can be implemented as transformer, wherein the primary side 103 forms a primary winding of the transformer and the secondary side 105 forms a secondary winding of the transformer.

In the following, the functionality of the circuit shown in FIG. 1a is briefly summarized.

The basic arrangement of the switching assembly 100 comprises the transformer 101, into the primary side of which a transmitter output signal (the HF input signal 107) is fed. In FIG. 1a, the primary side 103 is a simple coil into which a single-phase (so-called "single ended", for example, reference potential-related) transmitter output signal is fed.

The transmitter output signals 111a, 111b obtained on the secondary side 105 also exist as single-phase ("single ended") signals with regard to the ground connected to the high-frequency ground node 117. Thereby, in the first switching state, the first transmitter output signal 111a oscillates around the first reference potential Vref1, and in the second switching state, the second transmitter output signal 111b oscillates around the second reference potential Vref2.

Further, the transmitter means 101 or the transformer 101 can also have a primary winding, which is a coil with central tapping or comprises one, into the external (end) terminals of which a differential transmitter output signal is fed (as will be shown below with respect to FIG. 1b).

Both ends S1, S2 of the secondary side 105 or secondary winding 105 are each coupled to an output of the chip (of the high-frequency switching assembly 100) and form the two switched high-frequency outputs 113a, 113b (also referred to as Out1 and Out2) of the assembly.

Additionally, the assembly comprises the two internal switches SW1, SW2 (for example, integrated on a chip with the high-frequency switching assembly 100), which can be alternately opened and closed. When the switch SW1 is closed, the one end S1 of the secondary winding 105 in the closed state is clamped to the first reference potential Vref1, while the transmitter signal 107 (based on the transmission ratio of the transformer 101) is then available at the output Out1.

When the switch SW2 is closed (and switch SW1 opened) the ratios are vice versa, the coil end S2 is clamped to the reference voltage Vref2 and the transmitter signal can be tapped at the output Out2 (based on the transmission ratio of the transformer 101).

The switches SW1, SW2 can, for example, be implemented as a single transistor switch, transmission gate or relay. Control terminals of switches SW1, SW2 can be controlled in a complimentary manner or can be implemented complementary to one another.

For the HF output signals 115a, 115b applied to the output terminals 113a, 113b to correspond to the HF input signal 107, the transmission ratio of the transmitter means 101 or the transformer 101 can be selected to be 1:1. However, according to further embodiments, a selection of a different transmission ratio is also possible.

With the help of the two capacitances C1 and C2 connected between Vref1 or Vref2 and ground, the high-frequency signal current is given a low-ohmic return path from the signal sinks connected to the two outputs, since these sinks normally also use ground as a reference potential.

The ground node or ground terminal 117 can be implemented as a third chip terminal (in addition to the chip terminals of the output terminals 113a, 113b).

According to an embodiment, the reference potentials Vref1, Vref2 can be selected to be identical.

According to a further embodiment, the first reference potential Vref1 can be selected to be identical to the ground potential, and the second reference potential Vref2 can be selected equal to a supply voltage, as it is provided, for example, at the second primary side end terminal 121b of the primary side 103. In this case, the first reference potential terminal 119a can be omitted and the first switch SW1 can be directly connected between the first secondary side terminal S1 as well as the ground terminal 117.

Figure 1B:
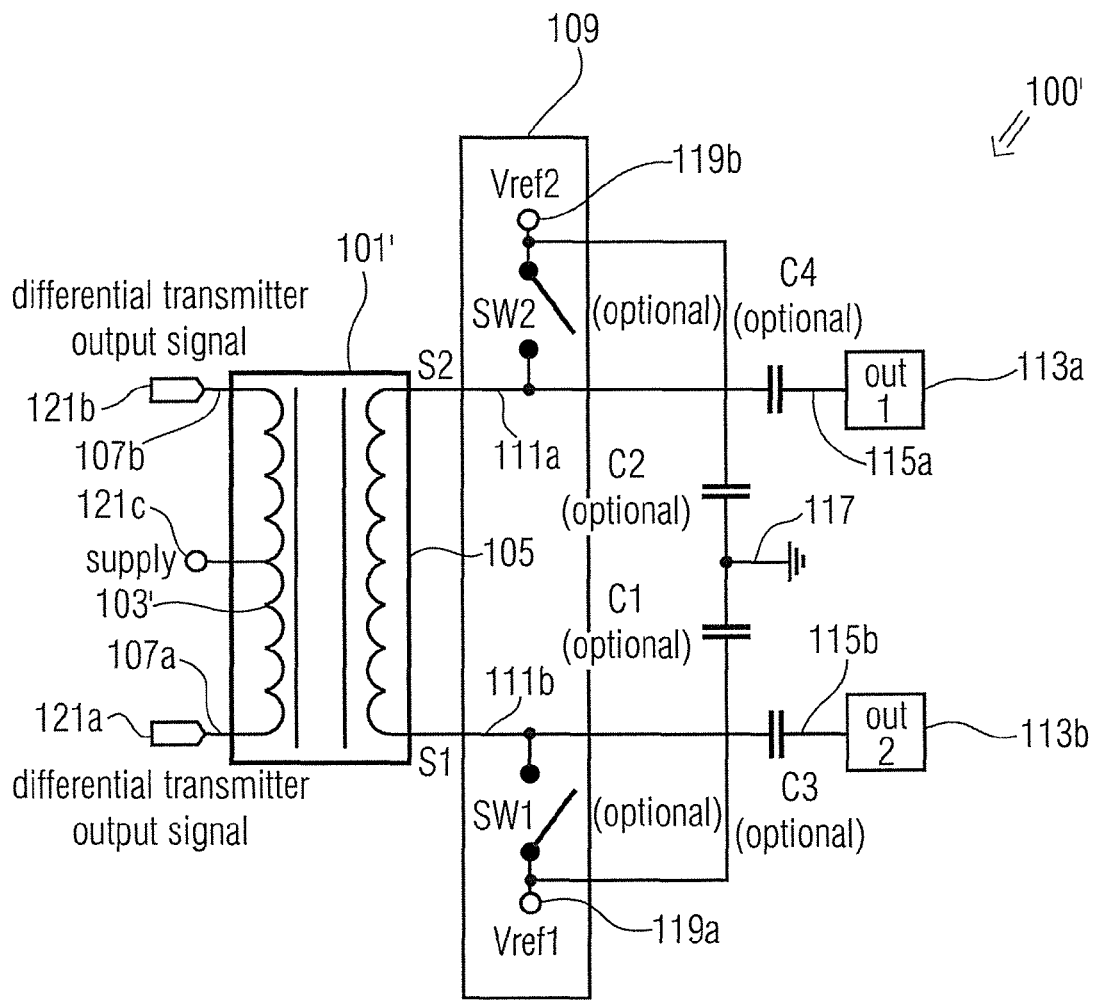
FIG. 1b is an equivalent diagram of a high-frequency switching assembly according to an embodiment for a differential HF input signal.

FIG. 1b shows an equivalent diagram of a high-frequency switching assembly 100' according to a further embodiment. The high-frequency switching assembly 100' differs from the high-frequency switching assembly 100 in that a transmitter means 101' of the HF switching assembly 101' is implemented to receive a differential transmitter output signal or a differential HF input signal. Thus, the transmitter means 101' comprises a primary side 103' having a first primary side end terminal 121a and a second primary side end terminal 121b as well as a central tapping terminal 121c. A first signal portion 107a of the differential HF input signal can be applied to the first primary side end terminal 121a. A second signal portion 107b of the differential HF input signal can be applied to the second primary side end terminal 121b. A reference potential, for example the first reference potential Vref1 or the second reference potential Vref2 or a further reference potential or a supply voltage or ground is provided at the central tapping 121c. In the example shown in FIG. 1b, merely exemplarily, the supply voltage is applied to the central tapping 121c.

Otherwise, the functionality of the high-frequency switching assembly 100' shown in FIG. 1b does not differ from the high-frequency switching assembly 100 shown in FIG. 1a, i.e., also in the high-frequency switching assembly 100', at the secondary side terminals S1, S2 the first transmitter output signal 111a is received as single-phase ("single ended") signal or the second transmitter output signal 111b as single-phase ("single ended") signal, depending on the switching state.

Thus, in the following, the functionality of the high-frequency switching assembly 100' shown in FIG. 1b will not be explained again.

Figure 2A:
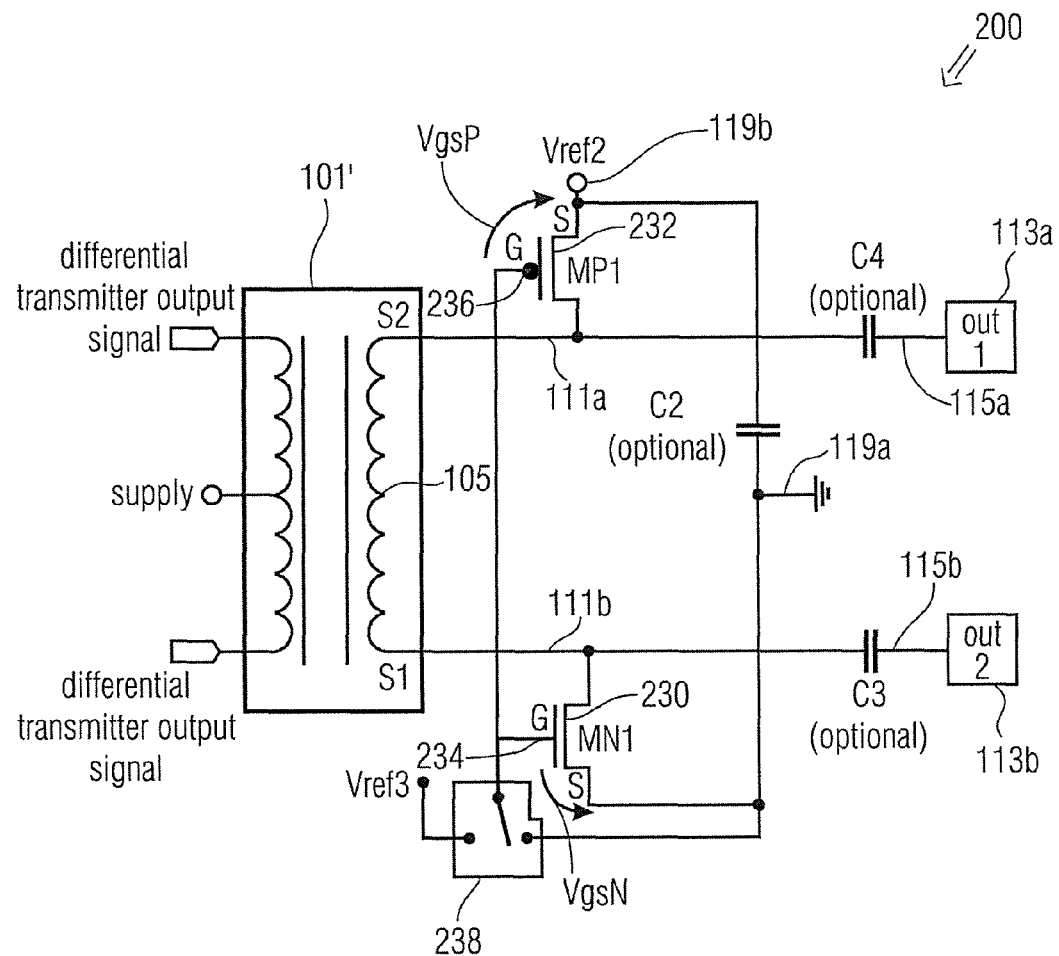
FIG. 2a is an equivalent diagram of a high-frequency switching assembly according to an embodiment for a standard CMOS semiconductor process.

FIG. 2a shows an equivalent diagram of a high-frequency switching assembly 200 according to a further embodiment. The high-frequency switching assembly 200 shown in FIG. 2a shows a possible implementation of the high-frequency switching assembly 100' shown in FIG. 1a in a standard CMOS process. Thereby, the first switch SW1 is implemented by means of a first switching transistor MN1. The second switch SW2 is implemented by means of a second switching transistor MP1. The first reference potential Vref1 forms the ground itself, thus, the blocking capacitance or blocking capacitor C1 can be omitted.

In the example shown in FIG. 2a, the first switching transistor MN1 is a NMOS transistor and the second switching transistor MP1 is a PMOS transistor.

According to further embodiments, the first switching transistor and the second switching transistor can also be of a different type, for example of the bipolar transistor type.

In the following, a source terminal of a transistor can, for example, be a source terminal or an emitter terminal of the transistor, a sink terminal can, for example, be a drain terminal or a collector terminal of the transistor and a control terminal can, for example, be a gate terminal or a base terminal of the transistor. The switchable path of a switching transistor can, for example, form a drain source path of the switching transistor or an emitter collector path of the switching transistor. Then, a main transistor current flows typically from the source terminal to the sink terminal, or vice versa.

In the present application, a switched-on state of a transistor means the state where a low-ohmic connection exists between the source terminal and the sink terminal of the transistor, a switched-off state of a transistor means a state where a high-ohmic connection exists between the source terminal and the sink terminal of the transistor.

For clarity reasons, not all reference numbers shown in FIG. 1b have been transferred to FIG. 2a.

As has already been explained, in the present embodiment the first reference potential Vref1 itself forms the ground, i.e., the first reference potential terminal 119a is equal to the former ground terminal 117. A switchable path 230 of the first switching transistor MN1 is connected between the first reference potential terminal 119a and the first secondary side terminal S1 of the secondary side 105 of the transmitter means 101', and a switchable path 232 of the second switching transistor MP1 is connected between the second reference potential terminal 119b and the second secondary side terminal S2 of the secondary side 105 of the transmitter means 101'.

A control terminal 234 of the first switching transistor MN1 is coupled to a control terminal 236 of the second switching transistor MP1 (for example directly connected). Due to the complementary selection of the two switching transistors MN1, MP1 as NMOS transistor and PMOS transistor, it can be achieved that one switching transistor is non-conductive while the other switching transistor is conductive (like an inverter realization). The high-frequency switching assembly 200 comprises a reference potential change-over switch 238, which is implemented to provide either a third reference potential Vref3 or the first reference potential Vref1 (for example, ground) at the control terminals 234, 236, based on the switching state of the high-frequency switching assembly 200. In the first switching state, the reference potential change-over switch 238 provides the third reference potential Vref3 at the control terminals 235, 236. A magnitude of the third reference potential Vref3 can, for example, be selected to be the same or higher than a magnitude of the second reference potential Vref2. A sign of the third reference potential Vref3 can be selected to be equal to a sign of the second reference potential Vref2. Further, the third reference potential Vref3 can be the supply voltage.

In the second switching state, the reference potential change-over switch 238 provides the first reference potential Vref1 (i.e., for example, ground) at the control terminals 234, 236 of the switching transistors 230, 232.

According to further embodiments, instead of ground and supply voltage, other potentials can be applied to the reference potential change-over switch 238. Here, it is only important that different logic levels (such as ground and supply voltage) are applied to the two input terminals of the reference potential change-over switch 238.

Under the assumption that the third reference potential Vref3 is higher (more positive) than the first reference potential Vref1 and then, in the first switching state, the first switching transistor MN1 is in its conductive state for providing the first reference potential Vref1 at the first secondary side terminal S1 and, in the second switching state, the second switching transistor MP1 is conductive for providing the second reference potential Vref2 at the second secondary side terminal S2.

For outputting the high-frequency signal (the first HF output signal 115a at the first output terminal 113a (Out1)), in this assembly, the first switching transistor MN1 can be switched to be particularly low-ohmic, since the full operating voltage can be used as gate source voltage VgsN for the transistor (the gate or control terminal 234 is connected to a sufficiently high positive voltage, e.g., to the second reference potential Vref2, when the second reference potential Vref2 is selected to be equal to the third reference potential Vref3, the source terminal or source is connected to ground). Due to the low forward resistance (along the switchable path 230 of the first switching transistor MN1), the switch (or switching transistor) MN1 does influence the signal or the return current only very little or not at all, and the assembly distorts the high-frequency signal only very little or not at all.

While the first switching transistor MN1 is conductive (i.e., is in the first switching state), the second switch SW2 is to be as high-ohmic as possible. This is obtained by implementing the second switch SW2 by the second switching transistor (the PMOS transistor) MP1, whose source terminal is connected to the positive high second reference potential Vref2. For the second switching transistor MP1 to be in a non-conductive state, its control terminal 236 (or its gate) is also provided with a voltage that is as high as possible (the third reference potential Vref3) in this state. When the second reference potential Vref2 is high enough, the signal at the first output terminal 113a or at the second secondary side terminal S2 cannot, even in its vertex, bring the second switching transistor MP1 into a reverse-conductive state (by exchanging the sink terminal and the source terminal of the second switching transistor MP1). Thus, the signal is not clipped and is completely available at the first output terminal 113a (Out1).

In some embodiments, the third reference potential Vref3 can be selected to be equal to the second reference potential Vref2. In these embodiments, the second reference potential Vref2 can be selected such that an amplitude of the first transmitter output signal 111a is higher than a potential difference between the second reference potential Vref2 and the first reference potential Vref1, at most by a magnitude of the transistor threshold voltage Uth of the second switching transistor MP1.

Or generally, in the case where the third reference potential Vref3 is selected to be equal to the second reference potential Vref2, the first reference potential Vref1 and the second reference potential Vref2 can be selected such that a maximum amplitude of the first transmitter output signal 111a or the second transmitter output signal 111b is higher than a potential difference between the first reference potential Vref1 and the second reference potential Vref2, at most by a value of a threshold voltage Uth of one of the switching transistors MN1, MP1.

In summary, the reference potentials Vref1, Vref2, Vref3 are selected such that in the first switching state of the HF switching assembly 200 (and the reference potential change-over switch 238), the first switching transistor MN1 is conductive and the second switching transistor MP1 is non-conductive and that in the second switching state of the HF switching assembly 200 (and the reference potential change-over switch 238), the first switching transistor MN1 is non-conductive and the second switching transistor MP1 is conductive.

For outputting the high-frequency signal (the second HF output signal 115b) at the second output terminal 113b (Out2), the control terminals 234, 236 of the switching transistors MP1, MN1 are connected to ground (to the first reference potential Vref1). Thereby, the first switching transistor MN1 receives a gate source voltage VgsN=0 and is non-conductive, while the second switching transistor MP1 receives a gate source voltage VgsP having a very high magnitude, since its source terminal is still connected to the second reference potential Vref2. The signal path (the switchable path 232) to the second reference potential Vref2 is correspondingly very low-ohmic. When Vref2 is high enough, even the deepest lower signal vertex cannot bring the first switching transistor MN1 to a reverse conductive state (where the sink terminal and the source terminal are exchanged).

Then, signal distortion will also not occur.

The capacitance C2 or the blocking capacitor C2 forms the short circuit for the signal current to ground, when the first output terminal 113a (Out1) is used, i.e., in the first switching state of the high-frequency switching assembly 200.

In summary, the switch assembly of the high-frequency switching assembly 200 shown in FIG. 2a comprises the first switching transistor MN1, which acts as first switch SW1 and the second switching transistor MP1, which acts as second switch SW2. Further, the switch assembly comprises the reference potential change-over switch 238 which serves for controlling the two switching transistors MP1, MN1.

Although in the embodiment shown in FIG. 2a, the transmitter means 101' or the transformer 101' is used, i.e., the high-frequency switching assembly 200 is implemented to receive a differential input signal, this transmitter means 100' can also be replaced by the transmitter means 101, such that the high-frequency switching assembly 200 is implemented to receive a single-phase (for example, supply voltage-related or ground-related "single ended") input signal.

Figure 2B:
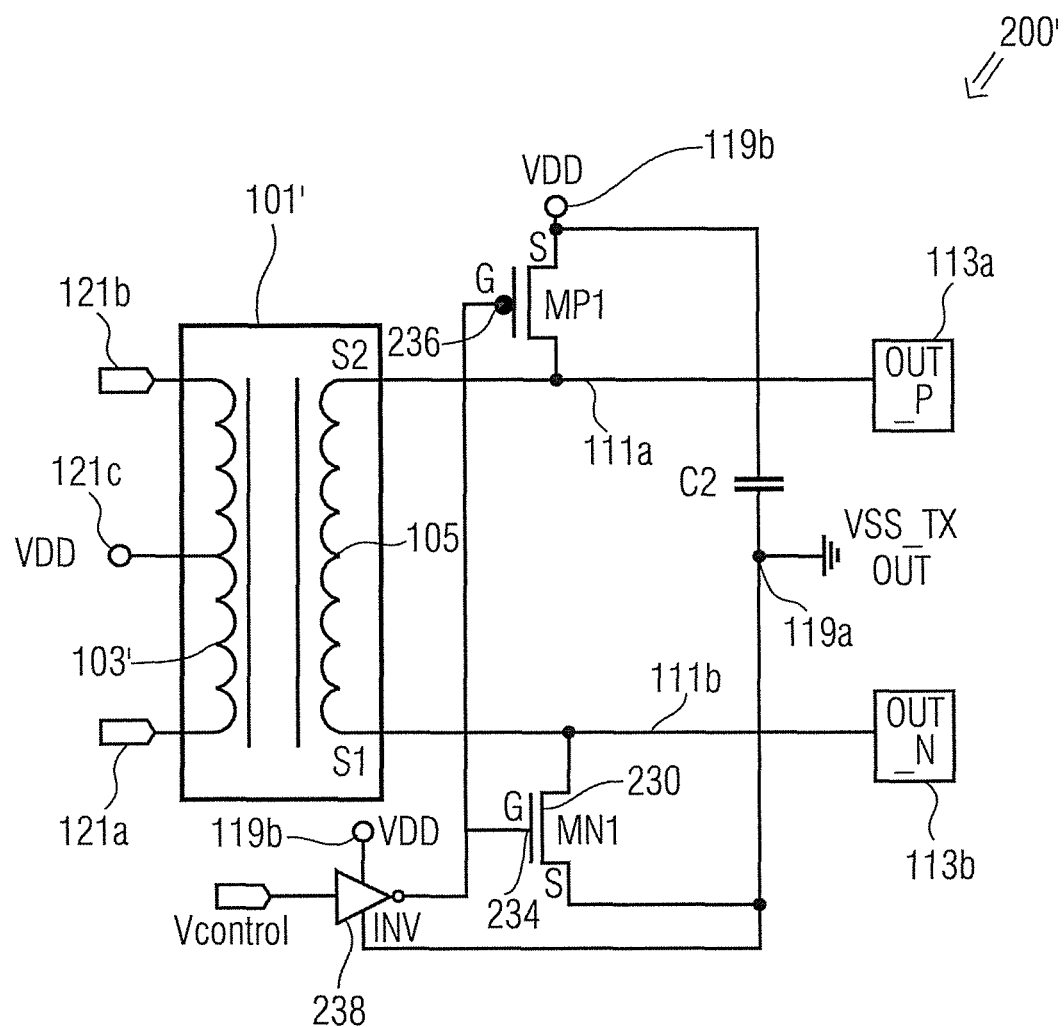

In an equivalent diagram, FIG. 2b shows a high-frequency switching assembly 200' as a possible implementation of the high-frequency switching assembly 200 shown in FIG. 2a in a CMOS process (CMOS=Complementary Metal Oxide Semiconductor). In the high-frequency switching assembly 200' shown in FIG. 2a, the second reference potential Vref2 or the second reference voltage Vref2 and the central tapping 121c of the primary side 103 of the transmitter means 101' or the transformer 100' is connected to VDD (operating voltage). Further, the reference potential change-over switch 238 shown in FIG. 2a is implemented by an inverter INV, which is controlled by means of a control voltage V control. Merely exemplarily, the two outputs 113a, 113b are DC coupled, i.e., the coupling capacitors C3, C4 are not included. Also, the first output terminal 113a is directly connected to the second secondary side terminal S2 of the secondary side 105 of the transmitter means 101' or the transformer 101'. The second output terminal 113b is directly connected to the second secondary side terminal of the primary side 105 of the transmitter means 101' or the transformer 101'. According to further embodiments, the output terminals 113a, 113b can also be coupled to the secondary side terminals S1, S2 via the coupling capacitors C3, C4.

According to further embodiments, the output terminals 113a, 113b can also be directly connected to the secondary side terminals S1, S2 in a switchable manner or coupled to the same by means of the coupling capacitors C3, C4.

As already mentioned, the output terminals 113a, 113b can form chip terminals where, for example, external signal components (such as transmitting paths for different communication bands) can be connected. Further, the first reference potential terminal 119a (the ground terminal) can form a further chip terminal of the high-frequency switching assembly 200'.

In summary, the high-frequency switching assembly 200' shown in FIG. 2b shows control of the control terminals 234, 236 of the switching transistors MN1, MP1 by means of an inverter INV, the output of which is coupled (for example directly connected) to the control terminals 234, 236. The inverter INV is implemented to provide either the first reference potential (ground) or the second reference potential (VDD) at a predetermined point in time to the control inputs 234, 236 of the switching transistors M1, MP1, depending on a control signal applied to one of its inputs via the inverter 238.

For example, a logic "1" (VDD potential) at the input of the inverter INV has the effect that the first reference potential Vref1 (ground) is provided at the control terminals 234, 236 of the switching transistors MN1, MP1, such that the high-frequency switching assembly 200' is in its second switching state. A logic "0" (for example, ground potential) at the input of the inverter INV has the effect that the second reference potential Vref2 (VDD) is provided at the control inputs 234, 236 of the switching transistors MN1, MP1 and the high-frequency switching assembly 200' switches to the first switching state.

By using the inverter INV in connection with the two complementary transistors MN1, MP1, it can be obtained that one of the two transistors MN1, MP1 is non-conductive, while the other transistor is conductive. Thus, no expensive synchronization is necessitated for providing two control signals for controlling these two transistors which are, for example, different to one another.

Figure 3:
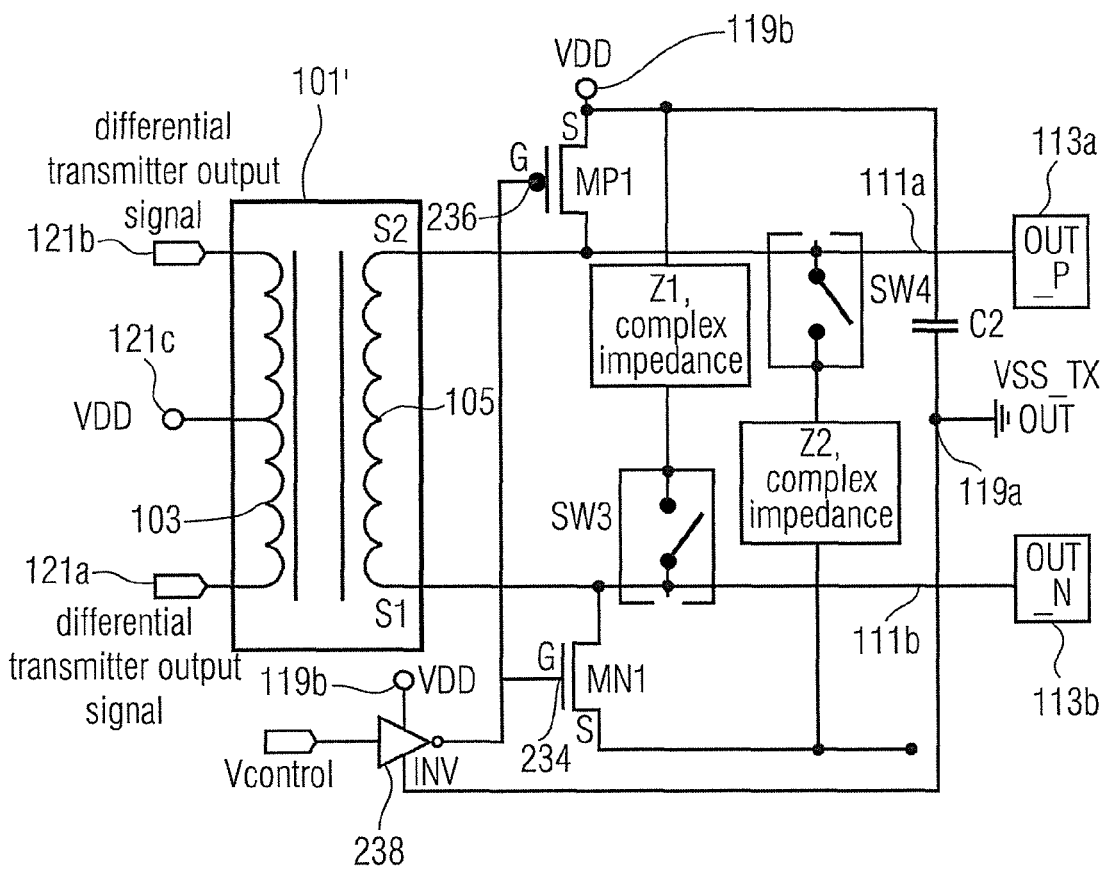
FIG. 3 is a possible extension of the circuit shown in FIG. 2b by switchable impedances.

FIG. 3 shows a possible extension of the high-frequency switching assembly 200' shown in FIG. 2b by switchable impedances Z1, Z2. A first (for example, complex) impedance Z1 is connected between the first secondary side terminal S1 and the second reference potential terminal 119b by means of a switch SW3. A second (complex) impedance Z2 is connected between the second secondary side terminal S2 and the first reference potential terminal 119a by means of a switch SW4.

The first impedance Z1 serves to adapt an impedance of the first secondary side terminal S1, for example to an external stage (connected to the second HF output terminal 113b), when the second transmitter output signal 111b is provided at the first secondary side terminal S1, i.e., when the second switching transistor MP1 is conductive and the first switching transistor M1 is non-conductive. Thus, the switch SW3 is placed into its conductive state when the second switching transistor MP1 is also placed in its conductive state, and is placed in its non-conductive state when the second switching transistor MP1 is also placed in its non-conductive state.

The second impedance Z2 serves to adapt an impedance of the second secondary side terminal S2, for example to an external stage (connected to the second HF output terminal 113b), when the first transmitter output signal 111a is provided at the second secondary side terminal S2, i.e., when the first switching transistor MN1 is conductive and the second switching transistor MP1 is non-conductive. Thus, the switch SW4 is placed in its conductive state when the first switching transistor MN1 is also placed in its conductive state, and is placed in its non-conductive state when the first switching transistor MN1 is also placed in its non-conductive state.

The impedances Z1, Z2 can be selected based on the stages connected or to be connected to the HF output terminals 113a, 113b.

The switches SW3, SW4 can be, for example, realized with one or several transistors. Further, the switches SW3, SW4 can be controlled by the inverter 238 together with the switching transistors MN1, MP1.

Further, the switchable impedances Z1, Z2 can also be applied to the high-frequency switching assemblies 100, 100', 200.

In embodiments of the present invention, both the transmitter component and the switch assembly can be arranged in an integrated manner on a common semiconductor substrate.

Figure 4:
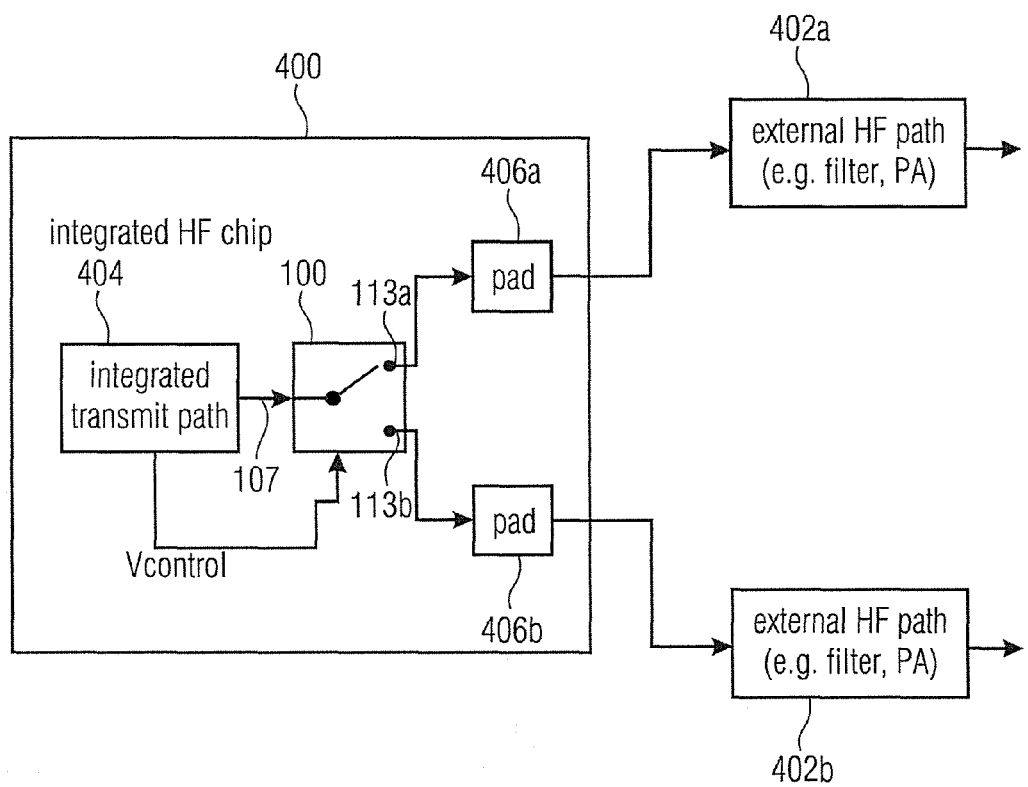
FIG. 4 is a block diagram of a transmitter according to an embodiment.

FIG. 4 shows a block diagram of a transmitter 400 according to an embodiment of the present invention. The transmitter 400 is coupled to a first external HF path 402a and a second external HF path 402b. External means in this case that the two HF paths 402a, 402b are not integrated together with the transmitter 400 on a semiconductor substrate. According to further embodiments, the HF paths 402a, 402b can also be integrated together with the transmitter 400 on a common HF chip. The transmitter 400 is implemented to provide a transmit signal (for example, the HF input signal 107) for a plurality of communication bands. Thereby, the first HF path 402a is allocated to a first communication band and the second HF path 402b is allocated to a second communication band. The transmitter 400 comprises a transmit signal provider 404 (also referred to as an integrated transmit path 404), which is coupled to a high-frequency switching assembly 100 for providing the transmit signal to the high-frequency switching assembly 100 as the HF input signal 107, and to select a switching state of the HF switching assembly 100, based on a communication band, in which the transmit signal is to be transmitted. In the example shown in FIG. 4, the high-frequency switching assembly 100 is shown as a component of the transmitter 400. According to further embodiments, another HF switching assembly according to an embodiment can be used in the transmitter 400 (for example one of the HF switching assemblies 100', 200, 200'). Thus, the transmit signal provider 404 can provide the HF input signal 107 both as a single-phase signal (so-called single ending signal) and also as a differential signal in the high-frequency switching assembly. The first output terminal 113a of the high-frequency switching assembly 100 can be coupled (for example, directly connected) to a first pad 406a of the transmitter 400 or the chip, on which the transmitter 400 is integrated. Further, the second output terminal 213*b* can be coupled (for example, directly connected) to a second pad 406*b* of the transmitter 400 or the HF chip, on which the transmitter 400 is integrated.

Thus, for example in the first switching state of the high-frequency switching assembly 100, the transmit signal can leave the transmitter 400 via the first pad 406*a* and can be processed further in the external HF path 402*a*. In the second switching state of the high-frequency switching assembly 100, the transmit signal can leave the transmitter 400 via the second pad 406*b* and can be processed further by the second external HF path 402*b*.

If, for example, the high-frequency switching assembly 200' is used instead of the high-frequency switching assembly 100, the transmit signal provider 404 can generate the control signal Vcontrol for determining the switching state of the HF switching assembly 200' and hence a signal path of the transmit signal 107.

FIG. 4 shows a concept where an integrated signal switch is used on the transmitter side, wherein the chip manufacturer integrates a smaller number of universal transmitter circuits (for example, a smaller number of transmit signal providers 404), whose signal output cannot be connected directly to respectively one, but to two or more chip pins or several chip pads 406*a*, 406*b* via the also integrated high-frequency change-over switch 100.

Thus, embodiments describe a concept for implementing an integrated switch within a high-frequency chip for providing a transmitter output signal at selectively one of two high-frequency outputs (the output terminals 113*a*, 113*b*).

Figure 5:
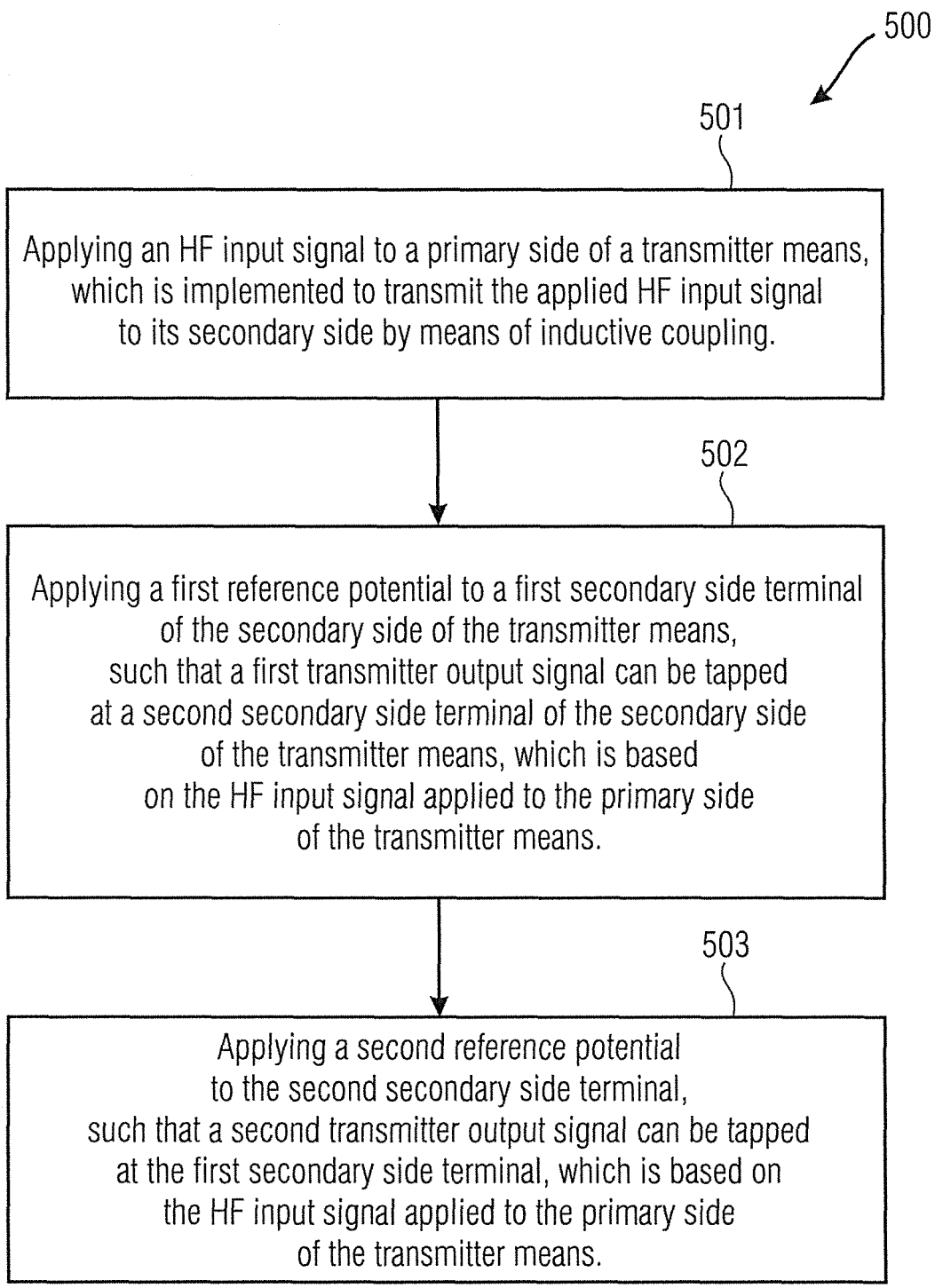
FIG. 5 is a flow diagram of a method according to an embodiment.

FIG. 5 shows a flow diagram of a method 500 according to an embodiment.

The method 500 comprises a step 501 of applying a HF input signal to a primary side of a transmitter means, which is implemented to transmit the HF input signal applied to its primary side to its secondary side by means of inductive coupling.

Further, the method 500 comprises a step 502 of applying a first reference potential to a first secondary side terminal of the secondary side of the transmitter means, such that a first transmitter output signal can be tapped at a second secondary side terminal of the secondary side of the transmitter means, which is based on the HF input signal applied to the primary side of the transmitter means.

Further, the method comprises a step 503 of applying a second reference potential to the second secondary side terminal, such that a second transmitter output signal can be tapped at the first secondary side terminal, which is based on the HF input signal applied to the primary side of the transmitter means.

The method 500 can be performed, for example, by means of one of the high-frequency switching assemblies 100, 100', 200, 200'. Steps 501, 502, 503 can be performed subsequently to one another.

In the following, several aspects of embodiments of the present invention will be summarized.

The HF input signal 107 as well as the HF output signals 115*a*, 115*b* and the transmitter output signals 111*a*, 111 can have, for example, a frequency domain of 5 MHz to 20 GHz, 100 MHz to 10 GHz or 700 MHz to 2.7 GHz.

The two reference potentials Vref1, Vref2 can be, for example, in a range of less than or equal to 24 V, 13 V, 5 V, 3 V.

The reference potentials Vref1, Vref2 can be selected independent of the HF input signal 107 and can, for example, be constant (over time).

Embodiments provide a so-called SPDT change-over switch (SPDT—single pole double throw, one input two outputs).

Embodiments of the present invention provide an assembly for implementing an integrated switch in a normal semiconductor process for controlling two high-frequency signal outputs by means of an internal transmitter. Such a switch can be arranged as a shunt switch in the signal path such that one of its ends is connected to a reference potential (high-frequency ground) and the high-frequency signal is thus not applied to both terminals of the switch. Thereby, the switch can be made low-ohmic and linear and the high-frequency signal is less affected.

Embodiments allow omitting a series switch to both terminals of which the high-frequency signal would be applied and hence would result in poorer performance by losses and distortions.

Several embodiments need only few changes compared to a standard assembly which normally includes a transformer at the transmitter output anyway.

Several embodiments have only a very small additional effort compared to a normal transmit assembly, substantially, in some embodiments, only an additionally necessitated output pad (for example, the ground terminal 117) contributes to the additional area consumption.

Embodiments of the present invention can be applied in HF transmitters, HF receivers, HF transceivers, such as in so-called HF transceiver chips.

Embodiments provide a signal output de-multiplexer for an integrated transmitter circuit.

Further embodiments provide a portable mobile radio device comprising a baseband processor, an antenna, a modulator circuit coupled to the base band processor and a high-frequency switching assembly according to an embodiment of the present invention coupled to the antenna and the modulator circuit. The baseband processor can be implemented, for example, to provide a (digital) baseband signal to the modulator circuit. The modulator circuit can be, for example, implemented to receive the baseband signal to obtain, based on the received baseband signal, the HF input signal (for example, based on a vector modulation or polar modulation of the baseband signal with a HF carrier signal) and to provide the received HF input signal to the high-frequency switching assembly. The antenna can be, for example, implemented to transmit a signal based on the first transmitter output signal and/or the second transmitter output signal of the high-frequency switching assembly (for example via an air interface).

Such a portable mobile radio device for voice communication and/or data communication (according to a mobile radio communication standard) can be implemented, for example with a further portable mobile radio device and/or a mobile radio base station.

A portable mobile radio device can be, for example, a mobile portable device, such as a mobile phone (cell phone), a so-called smart phone, a tablet PC, a broadband modem, a notebook or a laptop but also a router or a PC.

While several aspects have been described in the context of an apparatus, it is obvious that these aspects also present a description of the respective method, such that a block or a device of an apparatus can also mean a respective method step or a feature of a method step. Analogously, aspects have been described in the context with or as a method step, also present a description of a respective block or detail or feature of a respective apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A high-frequency switching assembly comprising a first switching state and a second switching state, comprising:
 a transmitter comprising a primary side and a secondary side, the secondary side comprising a first secondary side terminal and a second secondary side terminal, wherein the transmitter is configured to transmit a HF input signal applied to a primary side to a secondary side by an inductive coupling; and
 a switch assembly configured to apply, in the first switching state, a first reference potential to the first secondary side terminal, such that, in the first switching state, a first transmitter output signal is tapped at the second secondary side terminal, which is based on the HF input signal applied to the primary side of the transmitter, and to apply, in the second switching state, a second reference potential to the second secondary side terminal, such that, in the second switching state, a second transmitter output signal is tapped at the first secondary side terminal, which is based on the HF input signal applied to the primary side of the transmitter;
 wherein the switch assembly comprises a first switch configured to apply, in the first switching state, the first reference potential to the first secondary side terminal, and a second switch configured to apply, in the second switching state, the second reference potential to the second secondary side terminal;
 wherein control terminals of the first switch and the second switch are coupled to a reference potential change-over switch, wherein the reference potential change-over switch is configured to provide, in the first switching state, a third reference potential or the second reference potential at the control terminals of the first switch and the second switch and to provide, in the second switching state, the first reference potential at the control terminals of the first switch and the second switch such that, in the first switching state, the first switch is in a conductive state to apply the first reference potential to the first secondary side terminal, and such that, in the second switching state, the second switch is in the conductive state to apply the second reference potential to the second secondary side terminal;
 wherein the reference potential change-over switch comprises an inverter configured to provide either the first reference potential or the second reference potential at the control inputs of the first switch and the second switch in dependence on a control signal applied to an input of the reference potential change-over switch.

2. The high-frequency switching assembly according to claim 1, wherein the first switching state and the second switching state are subsequent in time, such that at a predetermined point in time either the first transmitter output signal is based on the HF input signal or the second transmitter output signal is based on the HF input signal.

3. The high-frequency switching assembly according to claim 1, further comprising a first output terminal and a second output terminal;
 wherein the first output terminal is coupled to the second secondary side terminal, such that, in the first switching state, a first HF output signal is tapped at the first output terminal, which is equal to the first transmitter output signal or based on the same; and
 wherein the second output terminal is coupled to the first secondary side terminal, such that, in the second switching state, a second HF output signal is tapped at the second output terminal, which is equal to the second transmitter output signal or based on the same.

4. The high-frequency switching assembly according to claim 3, wherein the first output terminal is coupled to the switch assembly such that, in the second switching state, a potential at the first output terminal is independent of the HF input signal; and
 wherein the second output terminal is coupled to the switch assembly such that, in the first switching state, a potential at the second output terminal is independent of the HF input signal.

5. The high-frequency switching assembly according to claim 1, further comprising at least one blocking capacitor, which is connected between a reference potential terminal where one of the reference potentials is provided, and a ground terminal of the high-frequency switching assembly to provide a high-frequency ground node.

6. The high-frequency switching assembly according to claim 1, wherein the first switch and the second switch are controlled such that, in the first switching state, the first switch is conductive and the second switch is non-conductive, and such that, in the second switching state, the second switch is conductive and the first switch is non-conductive.

7. The high-frequency switching assembly according to claim 1, wherein the first switch is connected between the first secondary side terminal and a first reference potential terminal where the first reference potential is provided, to couple, in the first switching state, the first secondary side terminal to the first reference potential terminal; and
 wherein the second switch is connected between the second secondary side terminal and the second reference potential terminal where the second reference potential is provided, to couple, in the second switching state, the second secondary side terminal to the second reference potential terminal.

8. The high-frequency switching assembly according to claim 1, wherein the first switch is configured as a first switching transistor, and the second switch is configured as a second switching transistor, and wherein control terminals of the switching transistors are connected such that the first switching transistor is in the conductive state when the second switching transistor is in a non-conductive state and vice versa.

9. The high-frequency switching assembly according to claim 8, wherein the first switching transistor is of a first transistor type and the second switching transistor is of a second transistor type complementary to the first transistor type.

10. The high-frequency switching assembly according to claim 1, wherein a switchable path of the first switch is connected between a first reference potential terminal where the first reference potential is provided, and the first secondary side terminal, and a switchable path of the second switch is connected between a second reference potential terminal where the second reference potential is provided, and the second secondary side terminal.

11. The high-frequency switching assembly according to claim 1, wherein a magnitude of the third reference potential is selected to be higher than or equal to a magnitude of the second reference potential.

12. A high-frequency switching assembly comprising a first switching state and a second switching state, comprising:

a transmitter comprising a primary side and a secondary side, the secondary side comprising a first secondary side terminal and a second secondary side terminal, wherein the transmitter is configured to transmit a HF input signal applied to a primary side to a secondary side by an inductive coupling; and a switch assembly configured to apply, in the first switching state, a first reference potential to the first secondary side terminal, such that, in the first switching state, a first transmitter output signal is tapped at the second secondary side terminal, which is based on the HF input signal applied to the primary side of the transmitter, and to apply, in the second switching state, a second reference potential to the second secondary side terminal, such that, in the second switching state, a second transmitter output signal is tapped at the first secondary side terminal, which is based on the HF input signal applied to the primary side of the transmitter;

wherein the switch assembly comprises a first switch configured to apply, in the first switching state, the first reference potential to the first secondary side terminal, and a second switch configured to apply, in the second switching state, the second reference potential to the second secondary side terminal;

wherein control terminals of the first switch and the second switch are coupled to a reference potential change-over switch, wherein the reference potential change-over switch is configured to provide, in the first switching state, a third reference potential or the second reference potential at the control terminals of the first switch and the second switch and to provide, in the second switching state, the first reference potential at the control terminals of the first switch and the second switch such that, in the first switching state, the first switch is in a conductive state to apply the first reference potential to the first secondary side terminal, and such that, in the second switching state, the second switch is in the conductive state to apply the second reference potential to the second secondary side terminal;

wherein a magnitude of the third reference potential is selected to be higher than or equal to a magnitude of the second reference potential;

wherein the reference potential change-over switch comprises an inverter configured to provide, at a predetermined point in time, either the first reference potential or the second reference potential at the control inputs of the first switch and the second switch, in dependence on a control signal applied to an input of the reference potential change-over switch.

13. The high-frequency switching assembly according to claim 1, wherein the transmitter is configured as a transformer, wherein the transformer comprises the primary winding on the primary side and the secondary winding on the secondary side, wherein the first secondary side terminal forms a first terminal of the secondary winding and the second secondary side terminal forms a secondary terminal of the secondary winding.

14. The high-frequency switching assembly according to claim 13, wherein a first primary side end terminal of the primary winding is coupled to an input terminal of the high-frequency switching assembly or forms the same, to which the HF input signal is applied; and wherein a second primary side end terminal of the primary winding is coupled to a reference potential terminal, to which the first or the second reference potential is applied.

15. A high-frequency switching assembly comprising a first switching state and a second switching state, comprising:

a transmitter comprising a primary side and a secondary side, the secondary side comprising a first secondary side terminal and a second secondary side terminal, wherein the transmitter is configured to transmit a HF input signal applied to a primary side to a secondary side by an inductive coupling; and a switch assembly configured to apply, in the first switching state, a first reference potential to the first secondary side terminal, such that, in the first switching state, a first transmitter output signal is tapped at the second secondary side terminal, which is based on the HF input signal applied to the primary side of the transmitter, and to apply, in the second switching state, a second reference potential to the second secondary side terminal, such that, in the second switching state, a second transmitter output signal is tapped at the first secondary side terminal, which is based on the HF input signal applied to the primary side of the transmitter;

wherein the transmitter is configured as a transformer, wherein the transformer comprises a primary winding on a primary side and a secondary winding on a secondary side, wherein the first secondary side terminal forms a first terminal of the secondary winding and the second secondary side terminal forms a secondary terminal of the secondary winding;

wherein the high-frequency switching assembly is configured to receive the HF input signal as differential input signal;

wherein a first primary side end terminal of the primary winding is coupled to a first input terminal of the high-frequency switching assembly or forms the same, to which a first signal portion of the differential HF input signal is applied;

wherein a second end terminal of the primary winding is coupled to a second input terminal of the high-frequency switching assembly or forms the same, to which a second signal portion of the differential HF input signal is applied; and wherein the primary winding comprises a central tapping coupled to a reference potential terminal, to which the first reference potential or the second reference potential is applied.

16. The high-frequency switching assembly according to claim 1, wherein the transmitter and the switch assembly are arranged on a common semiconductor substrate in an integrated manner.

17. The high-frequency switching assembly according to claim 1, further comprising a first switchable impedance and a second switchable impedance; and wherein the high-frequency switching assembly is configured to couple, in the second switching state, the first switchable impedance to the first secondary side terminal and to couple, in the first switching state, the second switchable impedance to the second secondary side terminal.

18. A high-frequency switching assembly comprising a first switching state and a second switching state, comprising:

a transformer comprising a primary winding and a secondary winding, the second winding comprising a first secondary side terminal and a second secondary side terminal, wherein the transformer is configured to transmit an HF input signal applied to a primary winding to a secondary winding by an inductive coupling; and a switch assembly comprising a first switching transistor, a second switching transistor and an inverter;

wherein the first switching transistor is of a first transistor type and the second switching transistor of a second transistor type complementary to the first transistor type, and control terminals of the switching transistors are coupled to one another such that the first switching transistor is in a conductive state when the second switching transistor is in a non-conductive state;

wherein a switchable path of the first switching transistor is connected between a first reference potential terminal, where a first reference potential is provided, and the first secondary side terminal, such that the first switching transistor provides, in the conductive state, the first reference potential at the first secondary side terminal;

wherein a switchable path of the second switching transistor is connected between a second reference potential terminal, where a second reference potential is provided, and the first secondary side terminal, such that the second switching transistor provides, in the conductive state, the second reference potential at the second secondary side terminal;

wherein the control terminals of the switching transistors are coupled with an output of the inverter, wherein the inverter is configured to provide, in the first switching state, the second reference potential at the control terminals of the switching transistors, and to provide, in the second switching state, the first reference potential at the control terminals of the switching transistors, such that, in the first switching state, the first switching transistor is in the conductive state and provides the first reference potential at the first secondary side terminal, and a first transmitter output signal is tapped at the second secondary side terminal, which is based on the HF input signal applied to the primary winding, and such that, in the second switching state, the second switching transistor is in the conductive state and provides the second reference potential at the second secondary side terminal, and a first transmitter output signal is tapped at the first secondary side terminal, which is based on the HF input signal applied to the primary winding; and wherein the high-frequency switching assembly further comprises at least one blocking capacitor, which is connected between one of the reference potential terminals where one of the reference potentials is provided, and a ground terminal of the high-frequency switching assembly to provide a high-frequency ground node.

19. A transmitter for providing a transmit signal for a plurality of communication bands, comprising:
a high-frequency switching assembly comprising a first switching state and a second switching state, comprising:
a transmitter comprising a primary side and a secondary side, the secondary side comprising a first secondary side terminal and a second secondary side terminal, wherein the transmitter is configured to transmit a HF input signal applied to a primary side to a secondary side by an inductive coupling; and
a switch assembly configured to apply, in the first switching state, a first reference potential to the first secondary side terminal, such that, in the first switching state, a first transmitter output signal is tapped at the second secondary side terminal, which is based on the HF input signal applied to the primary side of the transmitter, and to apply, in the second switching state, a second reference potential to the second secondary side terminal, such that, in the second switching state, a second transmitter output signal is tapped at the first secondary side terminal, which is based on the HF input signal applied to the primary side of the transmitter;

wherein the switch assembly comprises a first switch configured to apply, in the first switching state, the first reference potential to the first secondary side terminal, and a second switch configured to apply, in the second switching state, the second reference potential to the second secondary side terminal;

wherein control terminals of the first switch and the second switch are coupled to a reference potential change-over switch that comprises an inverter configured to provide, at a predetermined point in time, either the first reference potential or the second reference potential at the control inputs of the first switch and the second switch, in dependence on a control signal applied to an input of the reference potential change-over switch.

20. A method, comprising:
applying an HF input signal to a primary side of a transmitter, which is configured to transmit the applied HF input signal to a secondary side by an inductive coupling;
applying, via a first switch in a first switching state, a first reference potential to a first secondary side terminal of the secondary side of the transmitter, such that a first transmitter output signal is tapped at a second secondary side terminal of the secondary side of the transmitter, which is based on the HF input signal applied to the primary side of the transmitter; and
applying, via a second switch in a second switching state, a second reference potential to the second secondary side terminal, such that a second transmitter output signal is tapped at the first secondary side terminal, which is based on the HF input signal applied to the primary side of the transmitter;
providing via a reference potential change-over switch coupled to a control terminal of the first switch and the second switch, in the first switching state, a third reference potential or the second reference potential at the control terminal of the first switch and the second switch and providing, in the second switching state, the first reference potential at the control terminal of the first switch and the second switch such that, in the first switching state, the first switch is in a conductive state to apply the first reference potential to the first secondary side terminal, and such that, in the second switching state, the second switch is in the conductive state to apply the second reference potential to the second secondary side terminal;
wherein the providing via the reference potential change-over switch coupled to the control terminal of the first switch and the second switch the reference potential change-over switch further comprises providing via an inverter of the reference potential change-over switch either the first reference potential or the second reference potential at the control inputs of the first switch and the second switch, in dependence on a control signal applied to an input of the reference potential change-over switch.

21. A mobile radio device comprising a transmitter for providing a transmit signal for a plurality of communication bands, the transmitter comprising:
a high-frequency switching assembly comprising a first switching state and a second switching state, comprising:
a transmitter comprising a primary side and a secondary side, the secondary side comprising a first secondary side terminal and a second secondary side terminal, wherein the transmitter is configured to transmit a HF input signal applied to a primary side to a secondary side by an inductive coupling; and a switch assembly is configured to apply, in the first switching state, a first reference potential to the first secondary side terminal, such that, in the first switching state, a first transmitter output signal is tapped at the second secondary side terminal, which is based on the HF input signal applied to the primary side of the transmitter, and to apply, in the second switching state, a second reference potential to the second secondary side terminal, such that, in the second switching state, a second transmitter output signal is tapped at the first secondary side terminal, which is based on the HF input signal applied to the primary side of the transmitter; and a transmit signal provider coupled to the high-frequency switching assembly for providing the transmit signal to the high-frequency switching assembly as the HF input signal and to select, in dependence on a communication band from the plurality of communication bands in which the transmit signal is to be transmitted, a switching state of the high-frequency switching assembly;

wherein the switch assembly comprises a first switch configured to apply, in the first switching state, the first reference potential to the first secondary side terminal, and a second switch configured to apply, in the second switching state, the second reference potential to the second secondary side terminal;

wherein control terminals of the first switch and the second switch are coupled to a reference potential change-over switch, wherein the reference potential change-over switch is configured to provide, in the first switching state, a third reference potential or the second reference potential at the control terminals of the first switch and the second switch and to provide, in the second switching state, the first reference potential at the control terminals of the first switch and the second switch such that, in the first switching state, the first switch is in a conductive state to apply the first reference potential to the first secondary side terminal, and such that, in the second switching state, the second switch is in the conductive state to apply the second reference potential to the second secondary side terminal;

wherein the reference potential change-over switch comprises an inverter configured to provide, at a predetermined point in time, either the first reference potential or the second reference potential at the control inputs of the first switch and the second switch, in dependence on a control signal applied to an input of the reference potential change-over switch.

\* \* \* \* \*